United States Patent [19]

Sharp et al.

[11] Patent Number: 4,913,934
[45] Date of Patent: Apr. 3, 1990

[54] PROCESS FOR MAKING LASER Q-SWITCH

[75] Inventors: Edward J. Sharp, Stafford; Richard R. Shurtz, II, Fairfax; Wolfgang Elser, Alexandria; Gary L. Wood, Fairfax, all of Va.

[73] Assignee: The United States of America as represented by the Secretary of the Army, Washington, D.C.

[21] Appl. No.: 213,819

[22] Filed: Jun. 30, 1988

Related U.S. Application Data

[62] Division of Ser. No. 46,329, May 6, 1987, Pat. No. 4,819,239.

[51] Int. Cl.$^4$ .............................................. B05P 5/06
[52] U.S. Cl. ........................................ 427/163; 427/168; 427/169
[58] Field of Search ................... 427/163, 168, 169; 350/169, 354, 96.12; 372/12

[56]          References Cited
         U.S. PATENT DOCUMENTS

| | | | |
|---|---|---|---|
| 2,398,506 | 4/1946 | Rogers | 427/163 |
| 2,400,877 | 5/1946 | Dreyer | 427/163 |
| 2,771,055 | 11/1956 | Kelley et al. | 427/162 |
| 3,816,160 | 6/1974 | Moore | 427/163 |
| 4,303,263 | 11/1981 | Postupuck | 427/168 |
| 4,367,170 | 1/1983 | Uhlmann et al. | 350/354 |
| 4,431,263 | 2/1984 | Garito | 350/96.34 |
| 4,531,809 | 7/1985 | Carter et al. | 350/354 |
| 4,536,450 | 8/1985 | Garito | 428/411.1 |
| 4,581,315 | 4/1986 | Garito | 430/269 |
| 4,691,982 | 9/1987 | Nishimura et al. | 350/96.12 |
| 4,711,532 | 12/1987 | Choe | 350/354 |
| 4,728,576 | 3/1988 | Gillberg-LaForce et al. | 427/169 |
| 4,794,045 | 12/1988 | Robin et al. | 428/411.1 |

FOREIGN PATENT DOCUMENTS

| | | | |
|---|---|---|---|
| 0081477 | 6/1983 | European Pat. Off. | 427/163 |
| 0161184 | 11/1985 | European Pat. Off. | 427/168 |
| 134677 | 9/1977 | Fed. Rep. of Germany | 427/169 |
| 60-403 | 1/1985 | Japan | 427/163 |
| 0208707 | 10/1985 | Japan | 350/96.12 |
| 63-14105 | 1/1988 | Japan | 427/163 |

Primary Examiner—Norman Morgenstern
Assistant Examiner—Marianne L. Padgett
Attorney, Agent, or Firm—Milton W. Lee; John E. Holford; Anthony T. Lane

[57]                   ABSTRACT

The present invention provides layered polymeric devices to control the spatial and spectral distribution of energy in optical beams, particularly high-intensity laser beams. These devices include improved versions of prior art thin-film (vacuum-deposited) interference filters, rugate structure anti-reflection coatings, Q-switches, pulse shapers, modulators, optical bistable devices and the like.

9 Claims, 5 Drawing Sheets

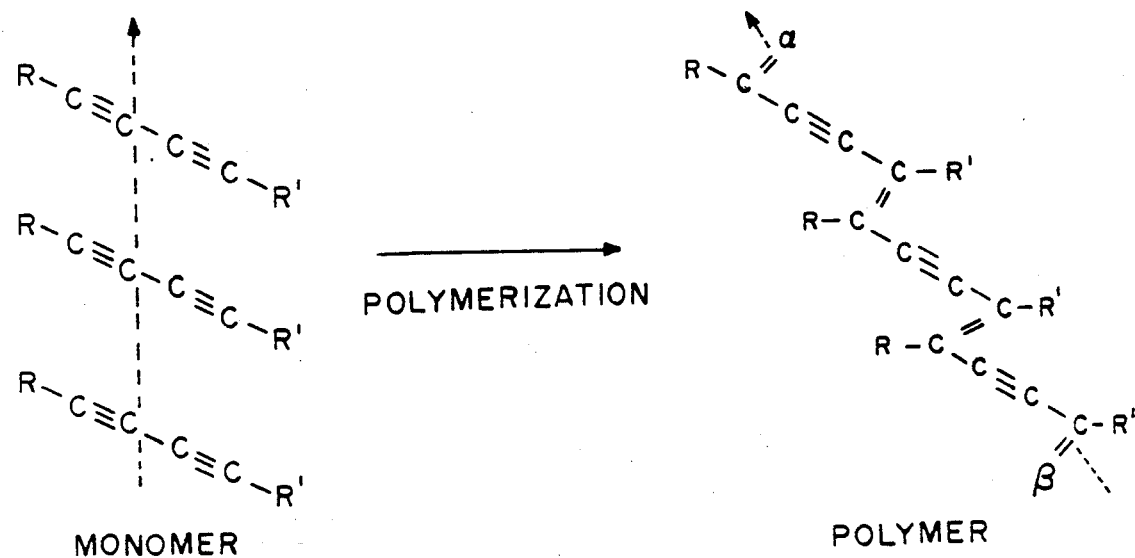
MONOMER
FIG. 1A
(PRIOR ART)
POLYMER
FIG. 1B
(PRIOR ART)
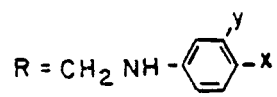
FIG. 1C
(PRIOR ART)
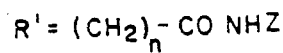
FIG. 1D
(PRIOR ART)

X-DEPOSITION (PRIOR ART)

Y-DEPOSITION (PRIOR ART)

Z-DEPOSITION (PRIOR ART)

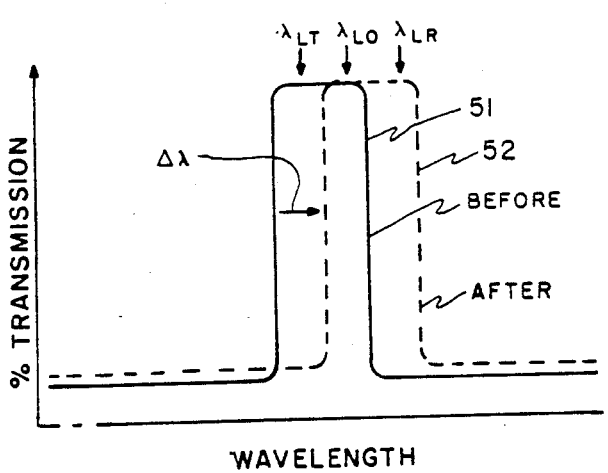
FIG. 5
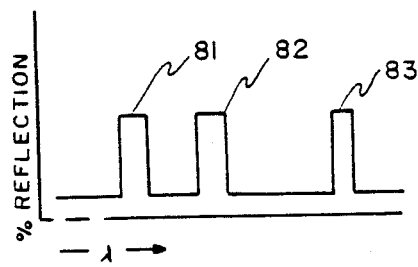
FIG. 8
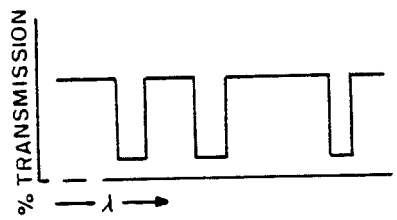
FIG. 9
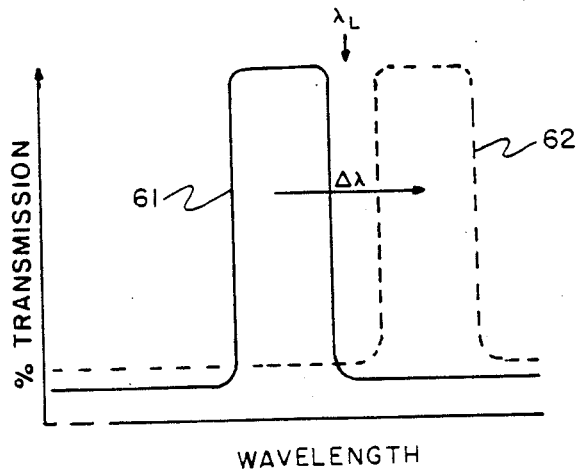
FIG. 6
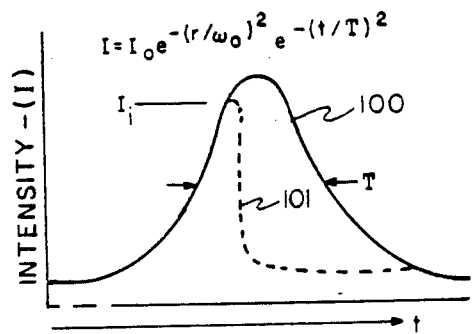
FIG. 10
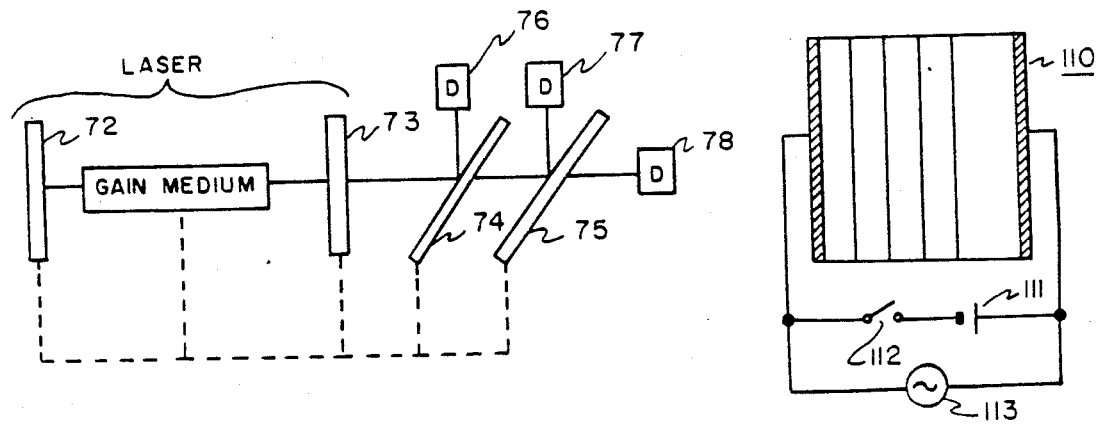
FIG. 7
FIG. 11

PROCESS FOR MAKING LASER Q-SWITCH

The invention described herein may be manufactured, used, and licensed by the U.S. Government for governmental purposes without the payment of any royalties thereon.

This application is a division of application Ser. No. 046,329, filed May 6, 1987 issued Apr. 4, 1989 as U.S. Pat. No. 4,819,239.

BACKGROUND

1. Field

The present invention relates to optical filters wherein the spatial and/or spectral distribution of radiation in a light beam is controlled actively or passively by the filter. In particular the invention is concerned with filters as described above which are constructed from thin films of polymeric material.

2. Prior Art

Numerous prior art filters have been constructed using thin layers of optically transparent material. The most popular have been filter structures wherein alternate layers have relatively high and low indices of refraction and the thickness of the layers is an integral number of quarter-wavelengths at the center frequency of the filter. The usual substrate material is glass or a crystalline substance upon which dielectric materials are deposited after evaporation in a vacuum chamber. Such filters are simple to analyze, but are obviously limited, mostly by the constraints imposed by their methods of manufacture.

Improvements in computer programming have now made it possible to design filters having any frequency characteristic without presuming either the discrete layer thicknesses or the discrete refractive indices of the materials used. In the final analysis these parameters are used as trade-offs to get the best possible filter characteristics within the constraints of available materials and processing techniques. One important conclusion that has emerged from these computational programs is that filters which have very narrow bandwidths can be made from materials which have only small differences in their indices of refraction. A computer program as described above entitled "OPTICAL THIN FILM SYNTHESIS PROGRAM BASED ON THE USE OF FOURIER TRANSFORMS" by J. A. Dobrowolski and D. Lowe was published in *Applied Optics*, Vol. 17, No. 19, 1 October 1978, pp 3039–3050.

Two additional advances in the optical art have had considerable impact on the design of thin layered filters. The first is the development of organic polymers as optical materials, and the second is the development of high-power laser sources, which produce extremely intense electric fields and have very narrow frequency bands, e.g., a few angstroms. The polymers may have centric or acentric lattice structures. These polymers interact non-linearly with externally applied electric fields and/or the intense electric fields associated with laser beams to produce marked changes in the indices of refraction. An object of the present invention is to utilize these phenomena in forming novel radiation-control devices based on layered structures of optical polymers.

SUMMARY OF THE INVENTION

Certain optical quality polymers have been found to exhibit relatively large second-order and third-order optical susceptibilities. The present invention seeks to exploit these properties to provide filters that automatically shift frequency characteristics at different radiation levels and/or can be similarly shifted by a separate electrical signal. A particular embodiment is the use of such an optical control element as one reflector in an optical resonator to provide an automatic or externally triggered Q-switch.

BRIEF DESCRIPTION OF THE DRAWINGS

The present invention is best understood with reference to the accompanying drawings wherein:

FIG. 1A shows a general diagram of a plurality of monomer molecules which can be used to form optical transmission elements;

FIG. 1B shows an idealized diagram of a polymer resulting from the polymerization of the monomer in FIG. 1A;

FIG. 1C shows the general chemical structure for one possible primary substituent radical end group R used in the polymer of FIGS. 1A and 1B;

FIG. 1D shows the general chemical structure for an alternative radical end group R' for the polymer in FIGS. 1A and 1B;

FIG. 5 shows one generalized graph of light transmission as a function of light wavelength for an applied voltage or for an intense optical field from an incident laser beam or both, for a FIG. 4 device;

FIG. 6 shows a graph similar to FIG. 5 for a like structure having slightly different design parameters;

FIG. 7 shows a laser system using filters as shown in FIG. 4;

FIG. 8 shows a graph as described wherein a filter structure has multiple reflection bands;

FIG. 9 shows a graph of a complementary filter structure to that shown in FIG. 8 having multiple transmission losses corresponding to the high reflectivity at the design frequencies;

FIG. 10 shows a graph of a Gaussian laser pulse, and a clipped pulse resulting from transmission of the Gaussian pulse through a filter of the type shown in FIG. 4;

FIG. 11 shows an active form of the filter structure of FIG. 4 having means to apply constant or time-varying electric fields to the layers of optical material;

DESCRIPTION OF THE PREFERRED EMBODIMENT

Figure 2A:
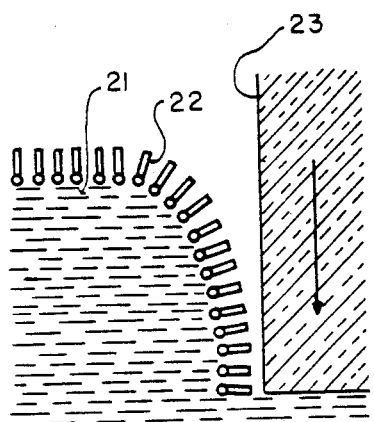
FIGS. 2a–2i show the alignment of single films of monomers by attachment to a substrate dipped according to the well-known Langmuir-Blodgett dipping process.
Figure 2B:
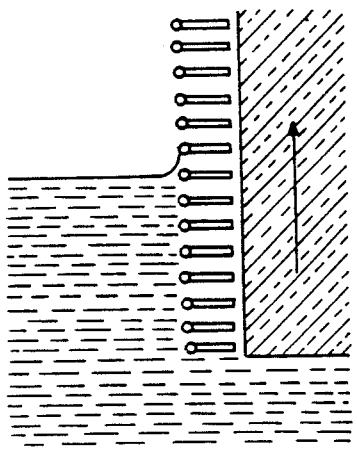
Figure 2C:
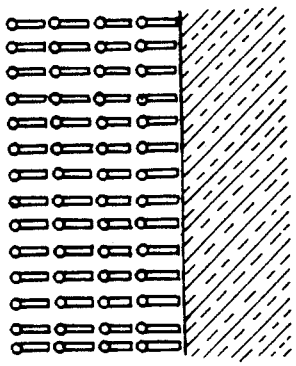

There has been a growing use of organic materials for optical elements. These materials are usually less fragile than the crystalline and glass elements they replace. Recent advances in high-power lasers are placing great thermal stresses on optical elements which organic elements are better equipped to handle. One example is in a layered filter wherein interfaces between materials having high and low indices of refraction are created at integral multiples of a quarter-wavelength. Intense fields build up at these interfaces, when laser intensities are reached, and can crack or explode these structures, if crystalline or glass materials are used instead of optical polymers.

FIGS. 1A–1D show the general organization of an optical polymer. FIG. 1A shows a group of organic molecules, generally, which after proper alignment can be polymerized as shown in FIG. 1B. The basic monomer structure shown is a straight chain of carbon atoms terminated at each end by a radical group R or R'. The molecules, for example, may be diacetylenes which upon polymerization form poly(en-ynes). The polymer bonding shown is idealized only, the important fact is that the pre-alignment of the monomer moulecules is sufficiently retained through the polymerizing process to provide crystal-like optical quality films. Typical radical structures, or primary substituents, for R and R' are shown at FIGS. 1C and 1D, respectively. Since by symmetry R can replace R' and vice versa, three general structures are indicated here, the structure using both R and R' results in an acentric structure. These three structures become more numerous as secondary substituents are chosen at sites X, Y and Z. Typical radical secondary substituents for X and Y are nitro, cyano, alkyl and alkoxy. Some substituents for Z are alkyl, alkoxyphenyl, nitrophenyl, alkylphenyl, cyanophenyl, alkylaminophenyl benzene ring and substituted benzene rings. The different values of n in R' also lead to many other structures. Only when R and R' are identical is the resulting structure truly centric. A description of diacetylenic materials used as photoresist appears in U.S. Pat. No. 4,581,315 issued 8 April 1986 to Anthony F. Garito.

Each of the structures described above has unique optical propagation properties, in the wavelength region from a few micrometers through near ultraviolet, which can be exploited. They have negligible susceptibility to magnetic polarization, but are significantly susceptible to electric polarization. Electric polarization in a material may be defined by the series $\vec{P}_{(\vec{r},t)} = \chi^{(1)}\vec{E}_{(\vec{r},t)} + \chi^{(2)}\vec{E}_{(\vec{r},t)}\vec{E}_{(\vec{r},t)} + \chi^{(3)}\vec{E}_{(\vec{r},t)}\vec{E}_{(\vec{r},t)}\vec{E}_{(\vec{r},t)} + \ldots$ The susceptibilities $\chi^{(n)}$ are functions only of the radiation frequency and the material characteristics. In passive polarization processes the material acts as a catalyst and energy conservation is preserved among the frequency components of the radiation field. In general, a component of the polarization at frequency $\omega_r$, where the polarization component $P(\omega_r) \alpha \exp(i\omega_r t)$ set up by components of the radiation field at $\omega_a$, $\omega_b$ can be expressed as $P^{(n)}(\omega_r = \omega_a + \omega_b + \ldots) = X^{(n)}(\omega_r; \omega_a, \omega_b, \ldots) E(\omega_a) E(\omega_b) \ldots$, where for passive processes the susceptibilities are predominantly real. Table I lists the passive nonlinear phenomena that can arise in materials that possess significant values of $\chi^{(n)}$ where n is greater than 1. Table I and Table II were compiled by D. S. Wherret in "Nonlinear Optics", edited by P. G. Harper, Academic Press, New York, NY, 1977, pp 4 and 5.

Hereafter, the first three $\chi^{(n)}$ terms will be referred to as first-, second-, and third-order terms or susceptibilities, respectively, and any term other than $\chi^{(1)}$ will be referred to as a higher-order term or susceptibility. As resonances are encountered in a material these susceptibilities become complex and under certain conditions may be considered to be totally imaginary. The imaginary part of the first- and third-order terms describes linear absorption and Raman scattering respectively. Such processes are called active and are listed in Table II.

TABLE 1

Passive nonlinear optical phenomena ($\omega = 0$ indicates the presence of a uniform electric field.)

| Frequencies of incident fields | Frequencies of fields generated by the polarization of the medium | Susceptibility | Process |
|---|---|---|---|
| $\omega_1$ | No polarization | $0(\epsilon = 1)$ | Vacuum propagation |
| $\omega_1$ | $\omega_1$ | $\chi^{(1)}(\omega_1:\omega_1)$ | Linear dispersion |
| $\omega_1, \omega_2$ | $\omega_3[\omega_3 = \omega_1 + \omega_2]$ | $\chi^{(2)}(\omega_3:\omega_1, \omega_2)$ | Sum mixing |
| $\omega_1$ | $\omega_3[\omega_3 = 2\omega_1]$ | $\chi^{(2)}(\omega_3:\omega_1, \omega_1)$ | Second harmonic generation |
| $\omega_1, 0$ | $\omega_1$ | $\chi^{(2)}(\omega_1:\omega_1, 0)$ | Electro-optic linear Kerr effect |
| $\omega_1$ | $\omega_2, \omega_3[\omega_1 = \omega_2 + \omega_3]$ | $\chi^{(2)}(\omega_2:-\omega_3, \omega_1)$ | Difference-frequency mixing |
| $\omega_1$ | $\omega_2[\omega_1 = 2\omega_2]$ | $\chi^{(2)}(\omega_2:-\omega_2, \omega_1)$ | Degenerate difference-frequency |
| $\omega_1$ | 0 | $\chi^{(2)}(0:-\omega_1, \omega_1)$ | Inverse electro-optic effect |
| $\omega_1, \omega_2, \omega_3$ | $\omega_4[\omega_4 = \omega_1 + \omega_2 + \omega_3]$ | $\chi^{(3)}(\omega_4:\omega_1, \omega_1, \omega_1)$ | Third harmonic generation |
| $\omega_1, \omega_2$ | $\omega_3, \omega_4[\omega_1 + \omega_2 = \omega_3 + \omega_4]$ | $\chi^{(3)}(\omega_3:-\omega_4, \omega_1, \omega_2)$ $\chi^{(3)}(\omega_4:-\omega_3, \omega_1, \omega_2)$ | Four-wave difference- |
| $\omega_1$ | $\omega_2, \omega_3, \omega_4[\omega_1 = \omega_2 + \omega_3 + \omega_4]$ | $\chi^{(3)}(\omega_2:-\omega_3, -\omega_4, \omega_1)$ | frequency mixing processes |

TABLE 1-continued

Passive nonlinear optical phenomena ($\omega = 0$ indicates the presence of a uniform electric field.)

| Frequencies of incident fields | Frequencies of fields generated by the polarization of the medium | Susceptibility | Process |
|---|---|---|---|
| $\omega_1$ | $\omega_1$ | $\chi^{(3)}(\omega_1:\omega_1, -\omega_1, \omega_1)$ | Intensity-dependent refractive index |
| $\omega_1, 0$ | $\omega_1$ | $\chi^{(3)}(\omega_1:0, 0, \omega_1)$ | Quadratic Kerr effect |

TABLE II

Active nonlinear optical phenomena

| Susceptibility | Process |
|---|---|
| $\chi^{(1)}(\omega_1:\omega_1)$ | Linear absorption ($\omega_1 \simeq \omega_{10}$) |
| $\chi^{(3)}(\omega_2:\omega_1, -\omega_1, \omega_2)$ | Raman scattering ($\omega_2 \simeq \omega_1 \pm \omega_{10}$) |
| $\chi^{(3)}(\omega_1:\omega_1, -\omega_1, \omega_1)$ | Two photon absorption ($2\omega_1 \simeq \omega_{10}$) or Saturable absorption ($\omega_1 \simeq \omega_{10}$) |
| $\chi^{(5)}(\omega_2:\omega_1, \omega_1, -\omega_1, -\omega_1, \omega_2)$ | Hyper-Raman scattering ($\omega_2 \simeq 2\omega_1 \pm \omega_{10}$) |

The diacetylenes described above exhibit significant values of second-order and third-order susceptibility. Using polarized static electric fields to excite second-order susceptibility and intense laser beams to excite the third-order susceptibility the index of refraction of these materials can be varied. In centric structures where R and R' are identical the second-order susceptibility is absent and the third-order susceptibility dominates. The third-order susceptibility is present in both centric and acentric polymeric materials.

FIGS. 2a-2i show well-known prior art techniques, originally developed by Langmuir and Blodgett, to obtain controlled arrangements of long chain molecules. A solution of a suitable monomer with opposed hydrophobic and hydrophyllic end groups may be dissolved in a water immisible solvent and allowed to spread over a water surface 21. The solvent then evaporates leaving the individual molecules 22 of the monomer. The hydrophyllic end groups, represented by the circular end on each molecule, attach themselves to the water surface. When lateral pressure is mechanically applied to decrease the area of the monomer film, resulting from the above steps, the molecules stand up like hairs with the hydrophobic end group, represented by the rectangular portions of the molecules, furthest from the water surface. When the edge of a thin substrate 23 is dipped through the monomer film into the water and withdrawn a one molecule thick layer of the monomer can be transferred to the substrate.

FIG. 2a-2i show an x-Deposition wherein lateral pressure is applied only as the substrate enters the water. A single molecule thick layer adhere to substrate as it enters the water (2a), but none is formed during withdrawal (2b). As the process is repeated identically oriented layers are built-up forming an assymetrical film structure (2c).

Figure 2D:
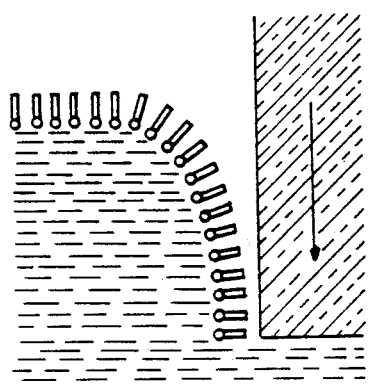
Figure 2E:
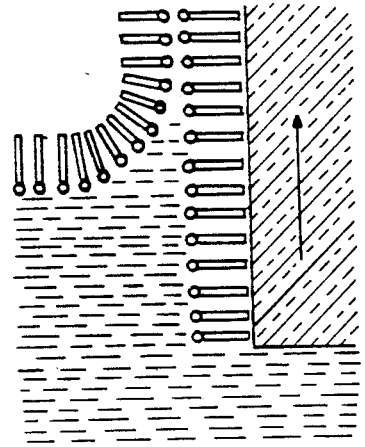
Figure 2F:
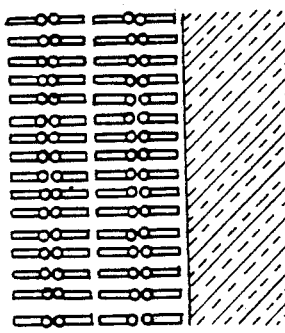

FIGS. 2d-2f show a Y-Deposition wherein lateral pressure is maintained throughout the dipping procedure. Not only does a layer form as the substrate enters the water (2d), but a second mirror-image layer is attached on withdrawal (2e). Repeating this process, produces the symmetrical film structure of FIG. 2f.

Figure 2G:
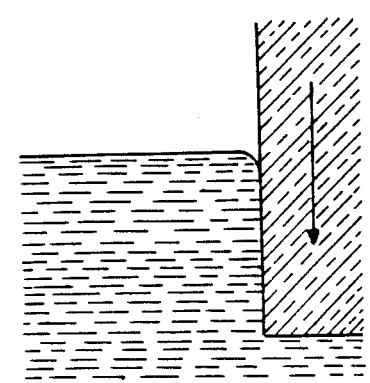
Figure 2H:
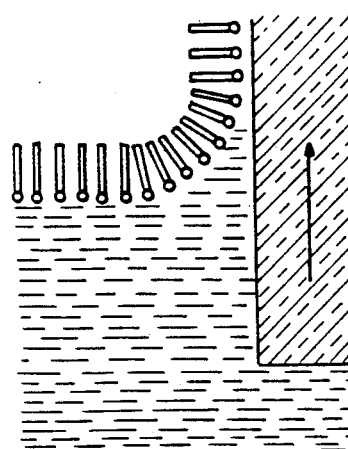
Figure 2I:
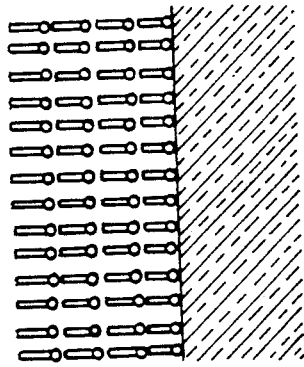

FIGS. 2g-2i show a Z-Deposition wherein the lateral pressure is applied only during withdrawal of the substrate from the water. No film is formed as the substrate enters the water (2g). A single film (2h) attaches as the substrate leaves the water. As process is repeated an assymmetrical film structure (2i) is formed similar to (2c), but oppositely oriented.

The substrate most of course have a suitable surface on which the first layer of the film can adhere. Glass substrates present a hydrophyllic surface which attracts hydrophyllic end groups and metal substrates on metal coated glass substrates present a hydrophobic surface which attracts hydrophobic and groups. Parting layers which can be dissolved away after polymerization can also be used.

Figure 3:
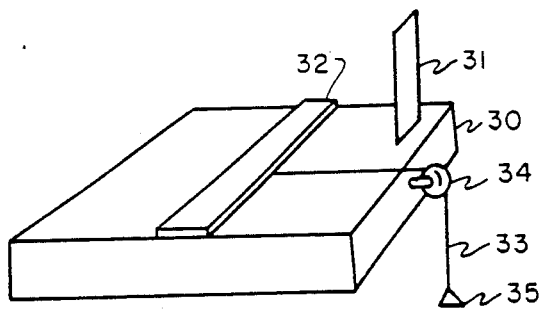
FIG. 3 shows a typical apparatus used to perform the dipping processes of FIGS. 2a–2i.

FIG. 3 shows a bare essential apparatus designed by Langmuir and Blodgett in the nineteen thirties and improved by Sher and Chanley in the nineteen fifties. The body of water is provided by a tray 30 filled to the brim into which the substrate 31 is inserted. A floating barrier 32 separates the water surface into two parts. The barrier is urged toward the part covered by the monomer by means of the cord 33, which passes over a pulley 34 mounted on the side of the tray and suspends a small weight 35. The barrier thus maintains a slight lateral pressure on the monomer film which ensures a continuous transfer of monomer film to the substrate under constant surface processors. Acid additives in the water have been found to improve the transfer and highly automated procedures have greatly simplified production of films in modern laboratories. Polymerization occurs when the resulting film or films are exposed to radiation such as sunlight, heat or various sources of ultra-violet radiation, depending on the structure of the monomer. After polymerization, the film structure can safely be removed from the substrate, if desired. Spincasting can also be used and will be discussed at FIGS. 12 and 13.

Figure 4:
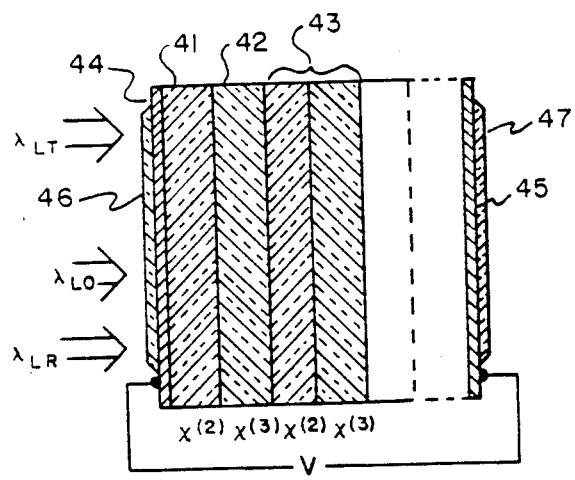
FIG. 4 shows a thin-film filter structure according to the present invention using alternating films of different optical material having non-linear refractive indices.

FIG. 4 shows a particularly advantageous filter structure which can be made by the above technique. The filter consists of a plurality of pairs 43 of films 41 and 42, the thickness of which can be controlled by the number of dippings discussed above. The linear susceptibilities of the films in each pair are different creating a well-known high-low interference filter. The film thickness can be a quarter-wavelength of some desired optical frequency, but it is preferred that the thickness be derived on the basis of a computation as described in the article by Dobrowolski et al, previously mentioned. This technique leads to rugate structures wherein there are no abrupt changes in susceptibility to cause local heating and filter distortion.

At least one and preferably both films in each pair have a significant second-order or third-order susceptibility. If only the third-order centric type is used no further refinements are necessary. The filter can be designed to pass or reflect a narrow band of frequencies near the center frequency of a high-power laser. The laser when activated provides an output that increases to a level sufficient to interact with the filter, detuning it slightly through the third-order susceptibility with results that will be discussed presently.

If the filter uses acentric material, the laser fields do not detune the filter through the second-order term, although some slight detuning may occur, if there is an appreciable value of third-order susceptibility in the acentric material. One way to employ the second-order term requires that conductive electrode coatings 44 and 45 be added, these coatings must also be transparent to the optical radiation passing through or reflected by the filter. These coatings, usually indium tin oxide, can be evaporated on the finished filter or placed on the substrate before the filter is fabricated. When a reasonable voltage is applied between these electrodes a high internal electric field results, due to the thin structure of the filte. The resulting detuning of the filter dwarfs the third-order effect due to radiation fields. When both centric and acentric materials are used to form each pair of films both effects can be used to considerably impact the detuning operation. Either can be considered to be a bias which enables the other to achieve the necessary degree of detuning. Three narrow-band input beams with center wavelengths $\lambda_{LT}$, $\lambda_{LO}$ and $\lambda_{LR}$, which may be provided from laser sources, are applied to the filter and are also shown in FIG. 4. The significance of radiation with these center wavelengths will be explained in FIG. 5. To reduce reflection from the electrodes anti-reflection coatings 46 and 47 may be added, these may be made from conventional dielectric's or from the same polymeric materials described above.

FIG. 5 shows a plot of transmission versus wavelength for a narrow-band filter according to the present invention. The solid curve 51 shows the pass-band of the filter when exposed only to relatively weak optical intensities. The dashed curve 52 indicates the pass-band when the second-order or third-order susceptibility is involved due to an intense radiation field, as from a high-power laser, or an electric field applied to the filter's electrodes. The legends "BEFORE" and "AFTER" refer to a change in the filter characteristics resulting from low- and high-intensity electric fields, respectively, or when an applied field is turned on. The magnitude of the change in wavelength $\Delta\lambda$ depends on the laser intensity or on the strength of the applied electric field and the process is completely reversible. In this case, the curves overlap only because of the design constraints placed on the filter. The center frequency of the pass-band is close to the center frequency $\lambda_L$ of an associated radiation source, which may be a laser output with a bandwidth of only a few angstroms. The two filter pass-bands define three areas of interest in which the laser center-wavelength may fall. The first indicated by the wavelength $\lambda_{LT}$ defines a region wherein the laser is initially transmitted and then is reflected. Another is designated by the wavelength $\lambda_{LR}$ where the reverse is true. The laser may also have a center-wavelength $\lambda_{LO}$ in the overlap region and always be transmitted. The laser beam will, however, be subject to phase shifts within the filter, which can be negligible or purposely enhanced to modulate the beam. The filter bandwidth and the total shift in the filter pass-band $\Delta\lambda$ can usefull be tailored to match the bandwidth of a laser and thereby provide the most reliable switching action.

FIG. 6 shows a switch or modulation design in which the pass-bands 61 and 62 of the filter do not overlap. The center-wavelength $\lambda_L$ of the radiation source falls in the gap between the two pass bands. In this arrangement, with a narrow-band laser and filter pass-bands of about the same magnitude, a momentary switching action is obtained. Pulse shaping can be obtained with any of the switching modes illustrated in FIGS. 5 and 6. This will be discussed further at FIG. 10.

FIG. 7 shows a laser system utilizing filters of the type discussed at FIG. 4. A gain medium and pump means to create a population inversion of atomic states in this medium 71 is positioned between two reflectors 72 and 73, which define a Fabry-Perot cavity for the laser system. Reflector 73 may be a simple partial reflector or a filter of the type discussed above. A preferred design for such a filter would be to provide a reflection band similar to the transmission band in FIG. 5. This band would then shift automatically with sufficient intracavity intensity or in response to an external signal, such as an applied electric field, or both. This action results in Q-switching the resonant cavity formed by 72 and 73 and allows the Q-switched laser pulse to infringe on filter 74. Filters 74 qnd 75 mounted in the beam of the laser outside of the cavity and at an angle to the beam would similarly pass or reflect the beams to devices 76, 77 and 78. The devices may be detectors, optical-transmission fibers or any other structure utilizing optical radiation. The reflectors 74 and 75 can be arbitrarily switched by an external signal or by the beam intensity to separate frequency or amplitude components of the beams. This arrangement is particularly useful with a laser or other radiation source operating over a broad band of frequencies and amplitudes.

FIG. 8 shows a possible spectral curve of radiation components with wave bands 81, 82 and 83 that could be delivered to devices like 76 and 77. Obviously such components can be recombined with mirrors, or fiber-optic couplers.

FIG. 9 shows a possible curve of radiation components transmitted to device 78 in FIG. 7, which of course is the complement of the curve in FIG. 8.

FIG. 10 shows the effect of a filter on a normal Gaussian pulse 100 from a laser having a center-wavelength corresponding to $\lambda_{LT}$ in FIG. 5. The filter must have a large third-order susceptibility that produces the switching action at intensity level $I_i$. From that point in time the intensity follows curve 101 defining a much sharper pulse. Obviously a filter having a characteristic as shown in FIG. 6 would also be useful, although it places more severe requirements on the third-order susceptibility. The second-order term can be activated by the Gaussian pulse if the polymer layer is transversely oriented to the propagation direction, and/or triggering can be adjusted or controlled by a properly polarized electric field steadily applied or synchronized with the Gaussian pulse.

FIG. 11 shows a low-frequency modulator employing the filter structure 110 shown in FIG. 4. To induce modulation, a bias means 111 activated by switch 112 increases the electric field to the point where the second-order susceptibility become prominent and the varying potential source 113 provides the forcing function required to form the desired modulation envelope. Switching and modulation functions can be performed singly or simultaneously on a plurality of input light beams as indicated at FIGS. 4 and 5.

Figure 12:
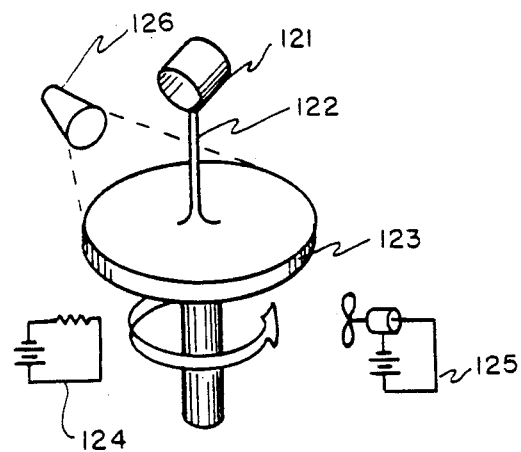
FIG. 12 shows a table-type centrifuge used to form circular films, e.g, photoresist layers on circuit boards.

FIG. 12 shows another method of forming polymer films known as spin casting. The monomer in solution or melted form is poured from container 121 in a thin stream 122 on the center of a spinning table 123, where it spreads due to centrifugal force. Adhesive forces prevent the material from flowing off the table. A heating element 124 may warm the table to increase the evaporation of solvent and/or reduce the viscosity of the monomer. A cooling device 125 may subsequently cool the table to stabilize the film. Orientation of the molecules is induced by the forces present as the film spreads. A radiation source 126, e.g., an ultra-violet lamp, may then be positioned to irradiate and polymerize the film, so that the process can be expeditiously repeated to form superposed films as previously described.

Figure 13:
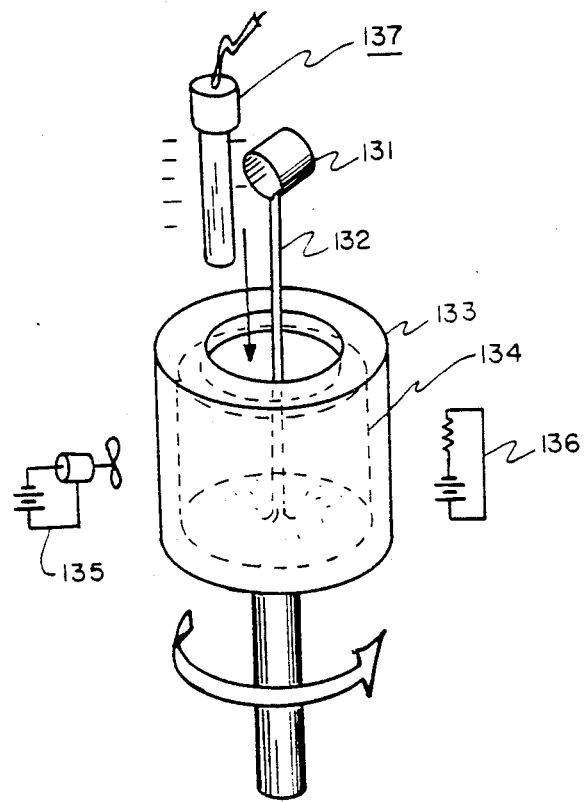
FIG. 13 shows a drum-type centrifuge which forms cylindrical films, easily transformed into rectangular films.

FIG. 13 shows a similar process where the monomer is poured from a container 131 in a stream 132 into a rotating drum 133 preferably with a vertical axis. The monomer spreads into a film 134 on the vertical cylindrical wall of the drum. One obvious advantage of each method is the shape of the film formed, this obviously will depend on the system where it is employed. The drum method can obviously apply greater spreading forces while the table method permits greater visibility for optical beam monitoring devices. Heating, cooling, and polymerizing devices 136, 135, and 137 respectively, may be employed as in the FIG. 12 device.

Having selected a suitable center frequency and width for the passband of the filter as pointed out at FIGS. 4 and 5; and having further obtained the thicknesses, dielectric constants and a preselected sequence for its layers, according to the article by Dobrowolski and Lowe; the process of forming a filter for a narrow frequency band of light radiation, which can be activated by a strong electric field with an intensity level such as that found in an intense laser beam and a specific polarization involves, for monomers, the following steps:

A. preparing a plurality of polymerizeable organic monomers, each having a different susceptibility to electric polarization, said monomers including at least one monomer having a prominent susceptibility at an order greater than one;

B. sequentially forming superposed films from different one of said monomers in said preselected sequence including said one monomer; and C. polymerizing said films into a unitary periodic structure.

The method may be performed by the Langmuir-Blodgett process when the monomers have first and second substituents at each end thereof, which are hydrophylic and hydrophobic, respectively, and the above steps A and B then include the substeps of:

A1. dissolving each said monomer in a separate volume of highly volatile solvent to produce a set of solutions;

B1. pouring a portion from one of the solutions on a clean water surface;

B2. evaporating said solvent;

B3. transferring the resulting monolayer to a substrate using the dipping technique of Langmuir and Blodgett;

B4. repeating steps B1–B3 until the monolayers form a layer of the preselected thickness; and B5. repeating steps B1–B4 with a different one of said solutions until said preselected sequence of films is completed.

The method may be performed on a spinning substrate wherein said steps A and B include the substeps of:

A1. dissolving each said monomer in a separate volume of highly volatile solvent to produce a set of solutions;

B1. pouring said solution on the surface of the substrate so as to spread the mixture by centrifugal force into a thin liquid sublayer;

B2. evaporating said solvent to form a solid sublayer;

B3. repeating B1 and B2 until the sublayers form a layer of the preselected thickness; and C2. repeating steps B1–B3 with a different one of said solution until said preselected sequence of layers is completed.

The method also may be performed on a rotating substrate when step B further includes the substeps of:

B1. melting one of the monomers

B2. pouring the melted monomer on the substrate so as to spread the monomer into a thin layer due to centrifugal force; and B3. repeating steps B1 and B2 until the preselected sequence of layers is completed.

In general, step C comprises the step of:

C1. polymerizing said films by irradiating them with an intense source of polymerizing radiation, which at least for diacetylenes may be an ultraviolet light source.

We claim:

1. The process of forming a narrow band light radiatio filter form from organic monomers with a first center frequency which can be detuned to a second center frequency by a strong electric field with an intensity level such as that found in an intense laser beam, comprising the steps of:

A. forming dielectric materials suitable for the deposition of a structure of superposed thin dielectric layers with various preselected dielectric constants and transparent to said above radiation, wherein the required successive differences in the dielectric constants of adjacent ones of said layers define a preselected sequence to provide a rugate interference form of said filter;

B. successively molecularly orienting and depositing said layers on a substrate transparent to said radiation with adjacent layers in contact while varying the material formulation between layer depositions such that said layers have first order susceptibilities to electric polarization of sufficient magnitude to provide said preselected dielectric constants but also have higher order susceptibilities of sufficient magnitude and polarity to provide said layers with slightly altered dielectric constants in the presence of said strong electric field, all of which alter said preselected sequence in a manner that shifts said first center frequency to a second center frequency; and C. treating the resultant structure to improve the bonding between said layers and said substrate while retaining their transparency.

2. The method according to claim 1 wherein said layers are formed from polymerizable monomers and Step C comprises the step of:

C. polymerizing said layers into a single structure.

3. The method according to claim 2, wherein Steps A and B comprise the following substeps:

A. forming a plurality of polymerizeable organic monomers, each having a different susceptibility to electric polarization, said monomers including at least one monomer having a prominent susceptibility at an order greater than one;

B1. dissolving each said monomer in a separate volume of highly volatile solvent to produce a set of solutions;

B2. pouring a portion from one of said solutions on a clean water surface to form a monolayer or film substantially one molecule thick;

B3. evaporating said solvent;

B4. transferring the resulting monolayer to a substrate using the dipping technique of Langmuir and Blodgett;

B5. repeating steps B1–B4 until the monolayers form a layer of said preselected thickness; and B6. repeating steps B1–B5 with a different ones of said solutions until the rugate filter structure is completed.

4. The method according to claim 2, wherein Step B comprises the following substeps:

B1. dissolving each said monomer in a separate volume of highly volatile solvent to produce a set of solutions;

B2. pouring the solution on the surface a rotating substrate so as to spread the mixture by centrifugal force into a thin liquid sublayer;

B3. evaporating the solvent to form a solid sublayer;

B4. repeating steps B1–B3 until the sublayers form a layer of said preselected thickness; and B5. repeating steps B1–B5 with a different one of the above solutions until the until the above mentioned preselected sequence of layers is completed.

5. The method according to claim 2, wherein Step B comprises the following substeps:

B1. melting one of said monomers;

B2. pouring the melted monomer on a rotating subtrate so as to spread said monomer into a thin layer due to centrifugal force; and B3. repeating steps B1 and B2 until the above mentioned preselected sequence of layers is completed.

6. The method according to claim 2 wherein:
said monomers are diacetylenes.

7. The method according to claim 3, wherein:
said monomers are diacetylenes.

8. The method according to claim 4, wherein:
said monomers are diacetylenes.

9. The method according to claim 5, wherein:
said monomers are diacetylenes.

* * * * *